United States Patent [19]

Yasutake et al.

[11] Patent Number: 5,440,121

[45] Date of Patent: Aug. 8, 1995

[54] SCANNING PROBE MICROSCOPE

[75] Inventors: Masatoshi Yasutake; Nobutaka Nakamura, both of Tokyo, Japan

[73] Assignee: Seiko Instruments Inc., Tokyo, Japan

[21] Appl. No.: 174,292

[22] Filed: Dec. 28, 1993

[51] Int. Cl.⁶ .................................................. H01J 37/00
[52] U.S. Cl. ................................................... 250/306
[58] Field of Search .................... 250/306, 307, 423 F

[56] References Cited

U.S. PATENT DOCUMENTS

| | | | |
|---|---|---|---|
| 5,168,159 | 12/1992 | Yagi | 250/306 |
| 5,185,572 | 2/1993 | Yagi et al. | 250/306 |
| 5,237,859 | 8/1993 | Elings et al. | 250/306 |
| 5,267,471 | 12/1993 | Abraham et al. | 250/306 |
| 5,291,775 | 3/1994 | Gamble et al. | 250/306 |

*Primary Examiner*—Bruce C. Anderson
*Attorney, Agent, or Firm*—Spensley Horn Jubas & Lubitz

[57] ABSTRACT

A scanning probe microscope uses a conductive material as a probe of AFM. The probe scans a sample while the probe is forcibly oscillated by applying alternating current voltage from an oscillator between the probe and the sample. Signals ω and 2ω from the probe are extracted with an analog processor using a discrete Fourier transformation, so that distribution of surface potential of the sample is obtained using the signals ω and 2ω.

4 Claims, 5 Drawing Sheets

$R > Z_0$ $C = 2\pi \varepsilon_0 R \ln\left(\dfrac{R}{Z_0}\right)$ $\left(\dfrac{\partial c}{\partial z}\right) = \dfrac{\varepsilon_0 \pi R}{Z_0^2}$ R ; RADIUS OF CURVANCE OF PROBE
Zo ; DISTANCE BETWEEN A PROVE AND A SAMPLE
C ; CAPACITANCE BETWEEN A PROBE AND A SAMPLE
ε ; DIELECTRIC CONSTANT IN THE AIR

(Z) ; PROBE LOCUS IN A CAPACITANCE MODE
(d) ; PROBE LOCUS IN A CONTACT MODE

FIG. 7

SCANNING PROBE MICROSCOPE

BACKGROUND OF THE INVENTION

This invention relates to high resolution and high speed scanning probe microscopes by which material information of a sample surface can be obtained.

Figure 2:
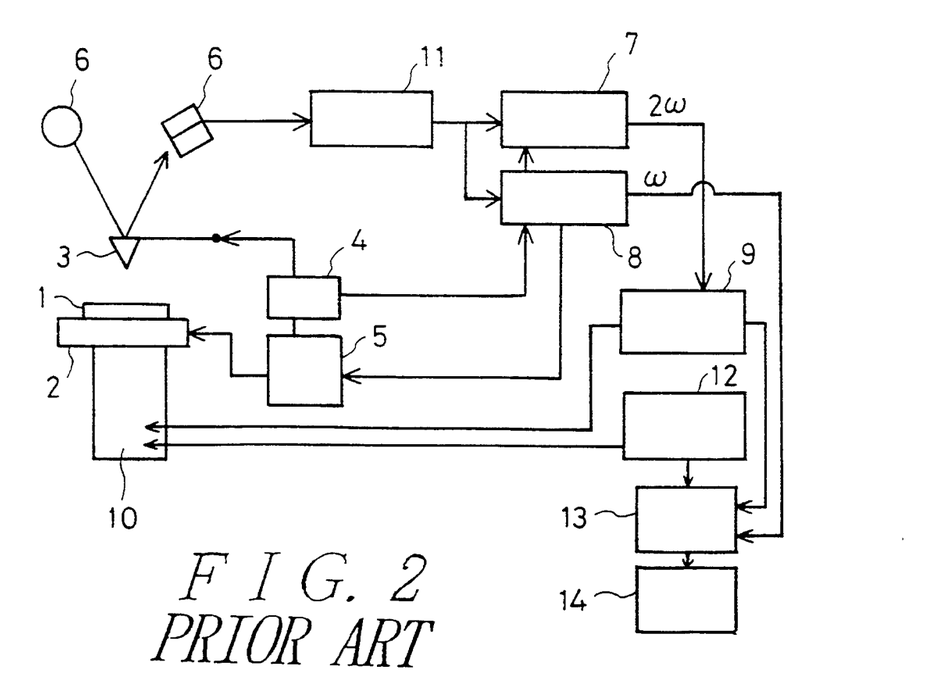
FIG. 2 shows the embodiment in prior art.

The Atomic Force Microscope (AFM) which can measure at the atomic level the surface contour or shape of insulating materials was invented by G. Binnig, C. F. Quate et al, in 1986. It was disclosed by Y. Martin et al (Appl. Phys. Letters, 52, 1103, 1988) that by way of the application of AFM, P-N junction surface potential was measured with high resolution at the sub-nanometer level. And recently, according to H. Yokoyama et al (Mal, Electronics Bio electronics 3, 79 1992) the potential difference of an aluminum-platinum junction was measured. In FIG. 2 the configuration of equipment used by yokoyama is shown.

In the setting where direct potential ($V_{Bias}$) for sample potential adjustment is supplied by a direct current bias power supply 5 and alternating current voltage ($V_{AC}\sin\omega t$) for probe drive is supplied by an alternating current power system 4 between a sample 1 and a sample stage 2, forced energizing of a probe 3 occurs due to capacitive coupling when probe 3 is very closely set in the neighborhood of a sample.

By detecting the amplitude of this forced energizing by way of a displacement detection system like optical lever system 6, the capacitance gradient between sample and probe is obtained by detecting the $2\omega$ element of excitation frequency by lock-in amplifier 7, and the surface potential Vs directly under probe 3 is obtained by detecting the $\omega$ element of excitation frequency by lock-in amplifier 8.

In order to have a graphic image of both capacitance gradient and surface potential, aiming and keeping that capacitance gradient $$\left[\frac{\partial c}{\partial z}\right] \qquad \text{(Formula 1)}$$

should be constant by controlling the distance between probe 3 and sample 1 by using a z-axis servo system 9 and a piezoelectronic scanner 10, distribution of surface potential at this moment is obtained from time to time. As regards methods for obtaining surface potential calibration, a method by which calibration is made by charging a known potential level to direct current bias power supply 5 for sample potential adjustment, or a feedback method by which the direct current bias power level 5 for sample potential adjustment is feed-back controlled so that the $\omega$ element of excitation frequency should be zero, may be applied.

In prior art equipment in which a probe is energized by a 5-10 kHz alternating current voltage, its displacement signal is detected using a Lock-in amplifier. Accordingly in order to obtain a sufficient S-N ratio in relation to the excision frequency, the time constant of the Lock-in amplifier should be kept at 10-20 msec or longer. Even in this situation, 7-14 minutes are necessary for generating a 200-200 element picture. When feedback control of the direct current power for sample potential adjustment is applied, a longer time, including this feed-back control time, is needed for the image acquisition. Even more, only surface potential difference distributions can be obtained by the prior art technology.

SUMMARY OF THE INVENTION

It is an object of the present invention to achieve high speed acquisition of distribution of permittivity and surface potential of sample surfaces in a manner to solve problems in the prior art as indicated above.

Figure 1:
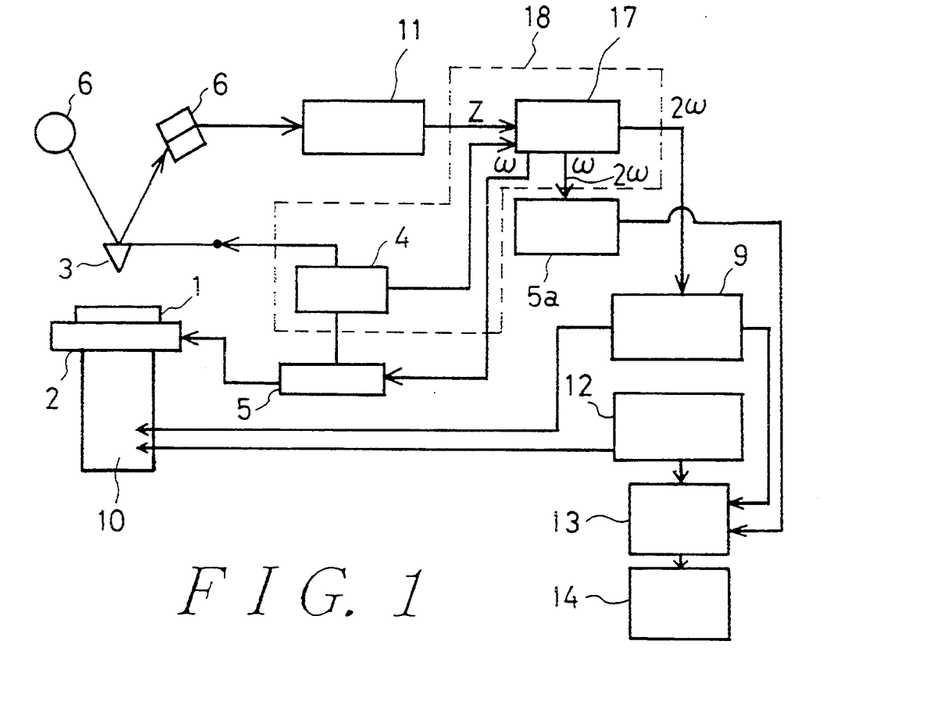
FIG. 1 shows a first embodiment of this invention.

In order to attain the above and other objects of this invention, there is provided an analog processor 17 using a discrete Fourier transformation as shown in FIG. 1 instead of 2 sets, 7, 8, of Lock-in amplifiers as shown in FIG. 2, and the $2\omega$ elements of signal frequency of the optical lever system can be obtained at a high speed, i.e. more rapidly permitted by the prior art.

In addition to the above, direct current bias power supply 5 for sample potential adjustment and a divider 5a are provided.

The aforesaid analogue processor 17 using discrete Fourier transformation detects $\omega$ and $2\omega$ elements with high speed (time constant is about 1 msec). On the other hand the aforesaid divider obtains distribution of surface potential of a sample, by way of processing the division of $\omega$ and $2\omega$ amplitudes.

DESCRIPTION OF THE PREFERRED EMBODIMENTS

FIG. 1 shows a configuration of the first embodiment in this invention, in which a sample 1 is set on a sample stage 2, and both sample 1 and sample stage 2 are brought, if necessary, below a conductive lever or a probe 3. An alternating current voltage ($V_{AC}\sin\omega t$) for probe energizing is supplied by an alternating current system 4 and a direct current voltage ($V_{Bias}$) for sample potential adjustment is supplied by power supply 5. When probe 3 comes close to sample 1, the capacitive coupling between sample 1 and probe 3 increases and forced oscillation of probe 3 occurs. The amplitude of this forced oscillation is detected by displacement detection system like optical lever system 6, etc, and the $\omega$ and $2\omega$ elements, or components, of amplitude of the signal frequency are detected by analog processor 17 using a discrete Fourier transformation.

The $\omega$ element obtained represents surface potential and $2\omega$ element obtained represents capacitance gradient between probe 3 and sample 1 in the direction between probe 3 and sample 1 (direction z, or vertical direction with respect to the plane of FIG. 1). In order to obtain a graphic picture of capacitance gradient and surface potential, the capacitance gradient $$\left[\frac{\partial c}{\partial z}\right] \qquad \text{(Formula 2)}$$

should be maintained constant by controlling the distance between probe 3 and sample 1 by operation of servo system 9 and piezoelectronic scanner 10, and at the same time by way of raster scanning in the X and Y directions using x, y raster scanning system 12, in-plane distribution of surface potential capacitance. On the other hand, surface potential can be likewise obtained through the processing operations of divider 5a.

Hereunder the principle will be shown as follows. The force that conductive lever receives according to capacitive coupling is shown as follows.

$$F = -(1/2)V^2 \left[\frac{\partial c}{\partial z}\right] \quad \text{(Formula 3)}$$

where V: voltage between probe and sample $$\left[\frac{\partial c}{\partial z}\right]:$$

z direction gradient of capacitive coupling.

Suppose that Vs is the surface potential under the probe, then $$V = V_{DC} + V_{ac}\sin\omega t \quad (2)$$

$$V_{DC} = V_{Bias} + V_s \quad (3).$$

The amplitude of probe displacement by forced energizing is $$S = \quad \text{(Formula 5)}$$

$$\frac{1}{k}\left[\frac{\partial c}{\partial z}\right]\left(V_{DC}^2 + 2V_{DC}V_{ac}\sin\omega t + \frac{(V_{ac})^2}{2}(1 - \cos 2\omega t)\right)$$

where k: the spring constant of the lever supporting probe 3.

Figure 3:
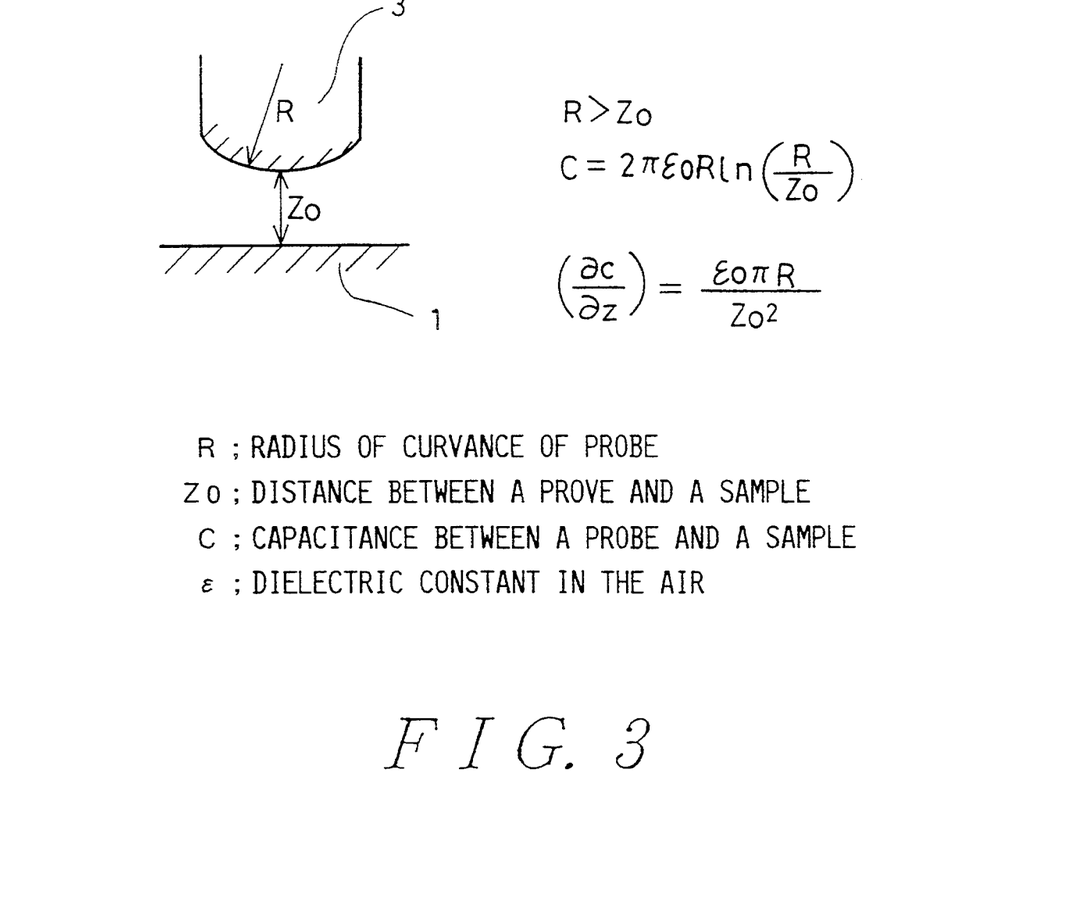
FIG. 3 shows capacitance between probe and sample.

Assuming that probe 3 has a tip with a radius of curvature R and is facing a planar sample 1 as shown in FIG. 3, the z direction gradient of capacitance between probe and sample is, $$\left[\frac{\partial c}{\partial z}\right] = -\frac{\epsilon_0 \pi R}{Z_0^2} \quad \text{(Formula 6)}$$

where $\epsilon_0$: dielectric constant between probe and sample, and $Z_0$: distance between probe and sample. Assuming that k=Constant, $V_{AC}$=Constant and $\epsilon_0$=constant, the output of locking-in amplifier term $2\omega$ is as follows;

$$V2\omega \propto (V_{AC}^2/2)(1/k)(\epsilon_0 \pi R/Z_0^2) \quad (6)$$
$$\propto (a/z_0^2)$$

where a: a proportionality constant.

By controlling z axis servo system 9 and piezoelectronic actuator 10 in that V2ω should be constant, the distance between probe and sample can be controlled by the constant. Accordingly, the irregularity picture of sample surface can be obtained by way of 2ω term, by x, y Raster scanning under the control above.

Next, assuming that output of lock-in amplifier term ω should be Vω.

$$V\omega \propto 2V_{DC} V_{AC}(1/k)(\epsilon_0 \pi R/Z_0^2) \quad (7)$$

Now that $V_{AC}$, $e_0$, $Z_0$, and k are all constant, $$V\omega \propto 2(V_{Bias} + V_s) b \quad (8)$$

where b: a proportionality constant

According to calibration methods, proportionality constant b is calculated by giving a known value to $V_{Bias}$, when $V_s=0$, and according to feedback methods, surface potential is directly read through $V_{Bias} = -V_s$, under the feedback control of $V_{Bias}$ by way of controlling so that Vω is constantly 0.

Now a procedure for obtaining surface potential by way of a processing operation with a divider will be explained hereunder, where neither calibration nor feedback is necessary. From (6), (7) the following is derived:

$$V\omega/V2\omega = 4 \ V_{DC}/V_{AC} = \alpha \quad (9)$$

From (9), (3), $$V_s = \beta(\alpha \ V_{AC}/4) - V_{Bias} \quad (10)$$

is derived.

Then, surface potential Vs is obtained through the real measurement of β, since $V_{AC}$, α and $V_{Bias}$ are all known. It should be noted that β is the ratio of an amplitude A(ω) to an amplitude A(2ω), where A(ω) and A(2ω) are amplitudes of probe displacement when energized with signals of radian frequency ω and 2ω, respectively. When 2ω is smaller than ω₀ which is the mechanically-tuned resonance frequency of the lever, it results that $(2\omega \leq \omega_0)\beta = 1$. And when the damping ratio of the lever and the mechanically-tuned resonance frequency of the lever are known, it can also be obtained from Formula 7 and (12).

$$A(\omega) = \frac{A_0}{\sqrt{(1-(\omega/\omega_0)^2)^2 + (\zeta\omega/\omega_0)^2}} \quad \text{(Formula 7)}$$

A(ω) : amplitude of radian frequency ω

$A_0$: displacement of probe caused with bending of lever by external force (electrostatic force in this case)

$\omega_0$: resonance frequency of lever

ζ: damping ratio $$\beta = (A(\omega)/A(2\omega)) \quad (12)$$

Next, unit 18 of FIG. 1 will be described in detail with reference to FIG. 4, in which a control circuit portion plays the role of lock-in amplifiers 7, 8 which detect voltage amplitude of attenuation current voltage ($V_{AC}$ sin$\omega t$), oscillating system 4, direct Bias($V_{Bias}$) power 5 and each element frequency $\omega$ and 2$\omega$ in prior art, FIG. 2.

Figure 4:
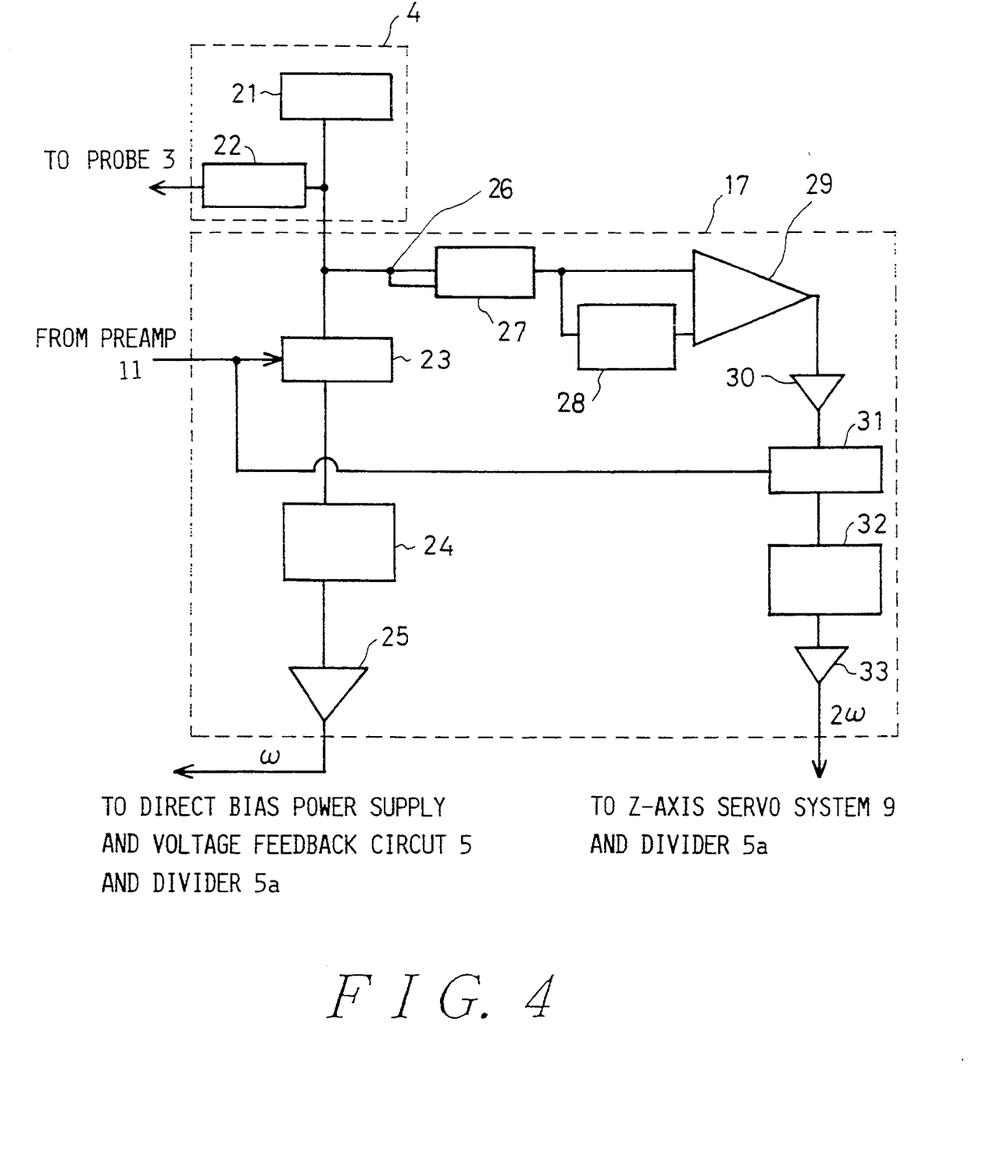
FIG. 4 shows a potential difference detector.

Block 21 of FIG. 4 is an oscillator system (for example, one made by Datel & Co. ROJIK) which generates a sine wave alternating voltage of predetermined frequency and amplitude. Oscillator 21 is coupled with an attenuator 22 and the output of attenuator 22 is supplied to conductive probe 3. Thus, the alternating signal supplied by alternating current system 4 to processor 17 has the same frequency and waveform as the signal supplied to probe 3, except that the signal to probe 3 is reduced in amplitude by attenuator 22. A first multiplier 23 (for example, model AD 532 made by Analogue Devices Corp.) is coupled to oscillator 21, and output voltage C against input voltages A and B is given as C=A·B/10, that is, the inputs to first multiplier 23 are the output (A) of oscillator 21 and the output Z (B) of preamp 11 in FIG. 1 and the output signal (C) of first multiplier 23 is 1/10 of the product of both inputs above. The output signal (C) of first multiplier 23 is smoothed by a first low pass filter 24 having a time constant of 1 ms, and is appropriately amplified by a second amplifier 25 and constitutes a signal of the $\omega$ frequency element. The amplified output signal from second amplifier 25 is output into direct bias power supply 5 in FIG. 1 and FIG. 2 and divider 5$a$ in FIG. 1 as an input thereto. The formulating of these input-output relation is as follows.

$$V\omega = K_2 \cdot \frac{\omega}{2\pi} \int_0^{\frac{2\pi}{\omega}} \frac{Z \cdot K_1 V_{AC}\sin\omega t}{10} dt = \frac{K_1 K_2 V_{AC}}{20} \cdot \left[ \frac{\omega}{2\pi} \int_0^{\frac{2\pi}{\omega}} Z \cdot \sin\omega t \, dt \right] \quad \text{(Formula 8)}$$

$V_\omega$: Output of amplifier 25
$K_1$ : Amplification factor of attenuator 22
$K_2$ : Amplification factor of amplifier 25
$\omega$: Radian frequency of output voltage from oscillator 21
Z : Output of preamp 11
$V_{AC}$: Amplitude of output voltage of oscillator 21
t : time As explained above, the $\omega$ frequency element of Z is proportional to the capacitive coupling force between sample 1 and probe 3 and has no energy deviation due to movement. Therefore, there is no phase shift between the element of Z and $V_{AC}$ sin $\omega t$.

Accordingly, Fourier the sine integral of Z in parenthesis of formula 8 at right hand side represents the Z amplitude of $\omega$ element.

The output signal from oscillator 21 is delivered to two branches at a diverging point 26, and both branches are input into a second multiplier 27. The second multiplier 27 outputs 1/10 voltage multiplied by the square of the sine voltage which is output from oscillator 21. A second low pass filter 28 with a time constant of 1 msec is coupled to the output of second multiplier 27 to smooth, i.e. remove short term variations in, the signal from multiplier 27 and to output the resulting smoothed signal. A subtractor 29 has inputs connected to the output of second multiplier 27 and the output of second low pass filter and outputs the difference of those outputs. Subtractor 29 has its output connected to the input of an inversion amplifier 30 which has a gain of −2. The relation between the output of oscillator 21 and the output of inversion amplifier 30 is as follows:

$$V_{30} = -2 \cdot \left[ \frac{V_{AC}^2 \sin\omega t}{10} - \frac{\omega}{2\pi} \int_0^{\frac{2\pi}{\omega}} \frac{V_{AC}^2 \sin\omega t}{10} dt \right] = -2 \cdot \quad \text{(Formula 9)}$$

$$\left[ \frac{V_{AC}^2}{10} \cdot \frac{1-\cos 2\omega t}{2} - \frac{\omega}{2\pi} \int_0^{\frac{2\pi}{\omega}} \frac{V_{AC}^2}{10} \cdot \frac{1-\cos 2\omega t}{2} dt \right] =$$

$$\frac{V_{AC}^2}{10} \cos 2\omega t.$$

$V_{30}$ : Output of inversion amplifier 30

That is to say, suppose that the output amplitude of oscillator 21 is equal to 10V, then the output of inversion amplifier 30 is given as the cosine of two times the frequency element $\omega$ with 10V of amplitude, which is the same amplitude as the original sine wave.

A third multiplier 31 has a first input connected to inversion amplifier 30 and a second input connected to preamp. 11 of FIG. 1, and outputs a voltage equal to 1/10 the product of the two input voltages. The output of third multiplier 31 is connected to the input of a third low pass filter 32 having a time constant 0.5 ms, and detects the Z amplitude of the 2$\omega$ element.

That is to say, $$V2\omega = V_{32} = \frac{\omega}{2\pi} \int_0^{\frac{2\pi}{\omega}} Z \cdot V_{30} dt = \quad \text{(Formula 10)}$$

$$\frac{V_{AC}^2}{10} \frac{\omega}{2\pi} \int_0^{\frac{2\pi}{\omega}} Z\cos 2\omega t \, dt = \frac{V_{AC}^2}{20} \cdot$$

$$\left[ \frac{\omega}{\pi} \int_0^{\frac{2\pi}{\omega}} Z \cdot \cos 2\omega t \, dt \right]$$

The Fourier cosine integral for z inside of brackets in Formula 10 represents an amplitude of 2 $\omega$ element of Z.

The output of third low pass filter 32 is transmitted to piezoelectronic control system 9 via a second amplifier 33 and is used as the z direction control signal of piezoelectronic scanner 10.

An explanation will now be given of a procedure for obtaining simultaneously the distributions of potential and permittivity of a sample surface.

Figure 5:
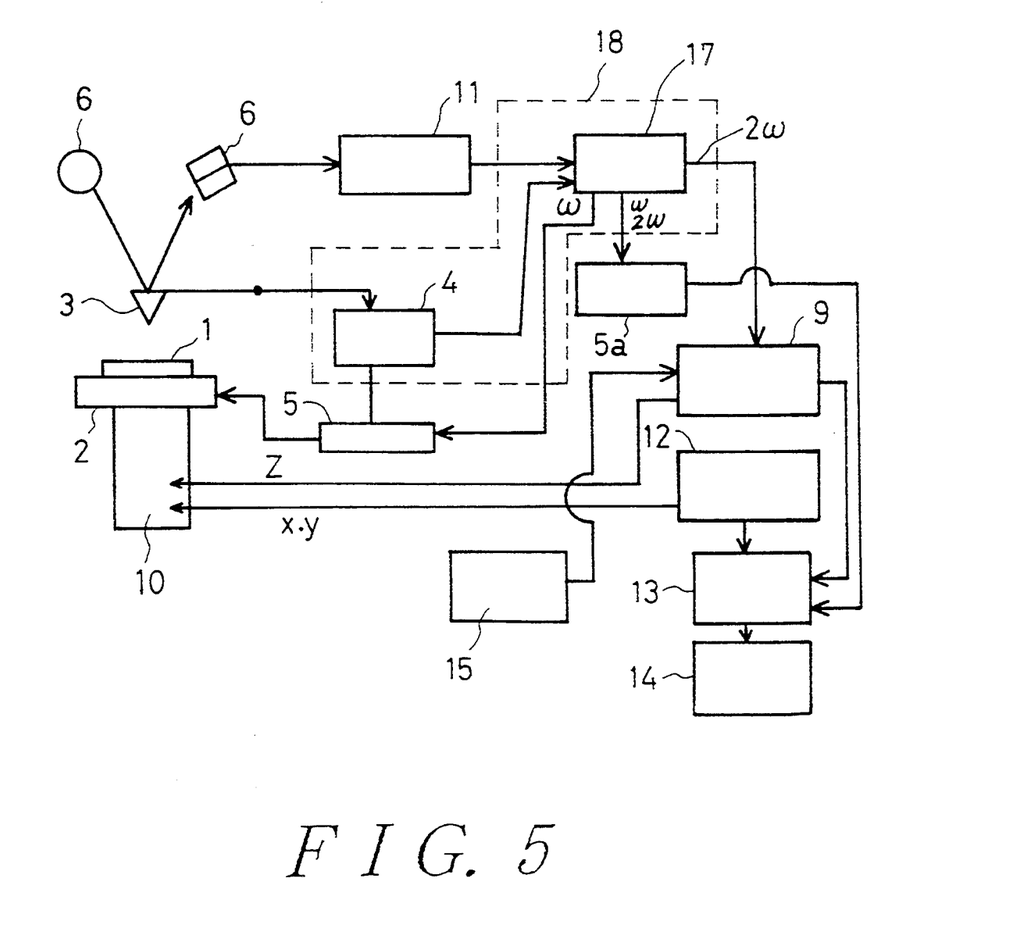
FIG. 5 shows a second embodiment of this invention.

FIG. 5 shows the second embodiment of this invention. The measurement method involves obtaining by each picture element an irregularity information value (d) of the sample and obtaining a distance information value (z) such that the z direction capacitance gradient should be constant. Its procedure is as follows:

Arbitrarily referring to one of each picture element, the alternating current voltage ($V_{ac} \sin \omega t$) and direct current voltage ($V_{Bias}$) between conductive probe 3 and sample 1 or sample stage 2 should be decreased to be zero at first. Then, by having probe 3 contact the surface of sample 1, z axis servo system 9 controls by using piezoelectronic scanner 10 in that the value of degree of levers camber should be constant. The control voltage produced by system 9 at this movement gives the irregularity information (d) of sample 1 (contact mode).

Next, probe 3 is moved to a certain position so that a predetermined distance may be left between probe 3 and the surface of sample 1 by applying a predetermined voltage to piezoelectronic scanner 10 from an offset voltage generator 15 after fixing z axis servo system. Next, an alternating current voltage is applied from oscillator 4 ($V_{Ac} \sin \omega$). When probe 3 begins to be oscillated at the amplitude defined by Formula 5, the z axis servo system should be released in that the V2$\omega$ value should come to be a predetermined value and again z axis servo system 9 and piezoelectronic scanner 10 should be controlled while the voltage of offset voltage generator 15 should be returned to zero. The controlled voltage at this moment gives information (z) to fix the capacitance between sample 1 and probe 3. (Capacitance mode). Next, in that the aforesaid information concerning (d) and (z) by each picture element should be obtained through measurement, total information of a picture can be obtained. The aforesaid method needs a lengthy period of time for measurement, although (d) and (z) information by each picture element can be obtained. When a shift of sample surface due to heat can be ignored, (d) and (z) information can be measured separately by switching from contact mode to capacitance mode or vice versa alternately by controlling the distance of a probe for each raster scan or a picture.

Figure 6:
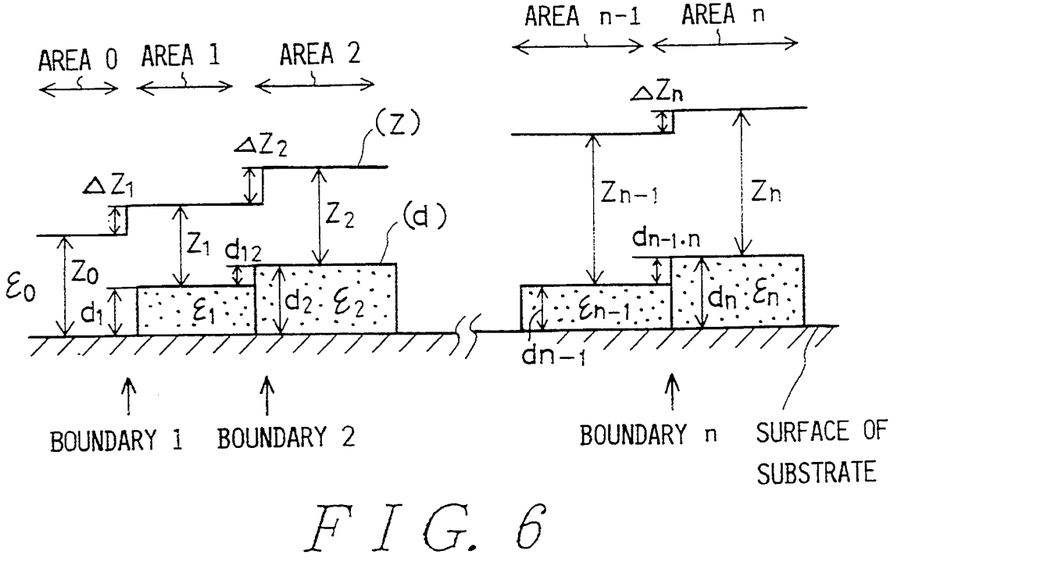
FIG. 6 shows a permittivity analysis model 1 (parallel model).
Figure 7:
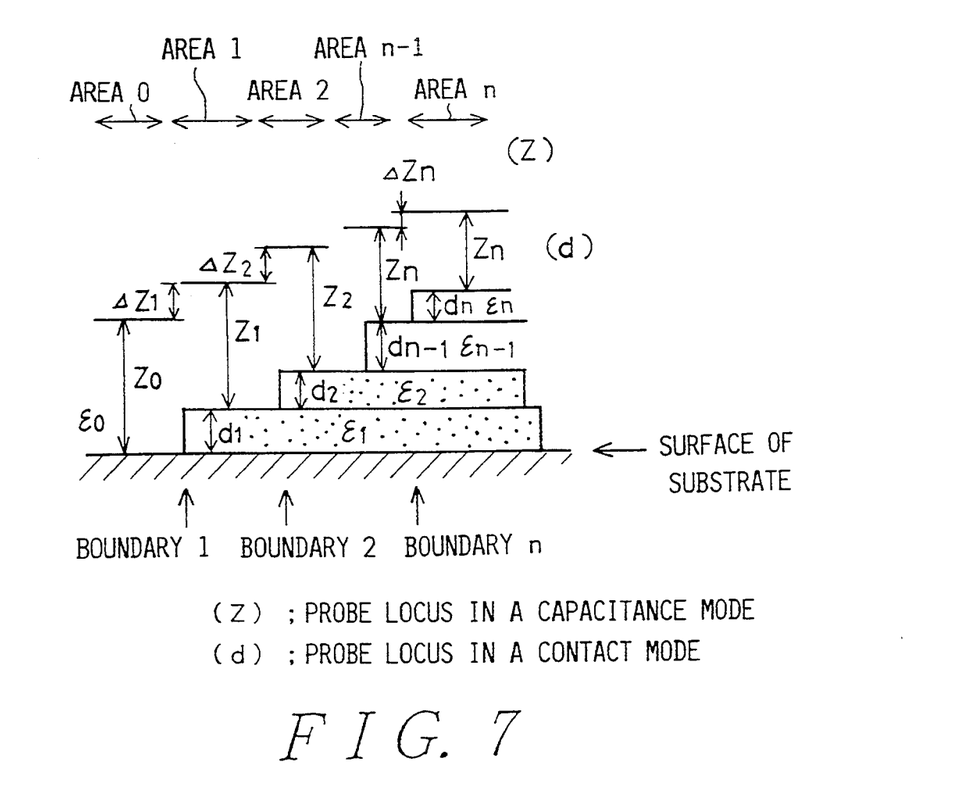
FIG. 7 shows a permittivity analysis model 2 (stack model).

Next, using d and z obtained as described above, the distribution of permittivity of the sample surface can be acquired. The following analysis is executed by the image processing system 13 shown in FIG. 1 & FIG. 5, and an algorithm for the permittivity will be explained below. FIG. 6 shows a model in which different permittivities and different heights reside in parallel side by side on a substrate (parallel model), and FIG. 7 shows another model that portions with different permittivities are stacked on each other (stack model). The substrate is a sample stage. The sample is the part to be observed and has portions with different permittivities and/or different heights, the sample being made of organic materials in many cases. Such cross sections of samples as shown in FIGS. 6 and FIG. 7 are processed by image processing system 13 shown in FIG. 1 and FIG. 5.

The parallel model is explained first hereunder. Suppose that d is the trace of probe 3 in the contact mode and that z is the trace of probe 3 in the capacitance mode. Suppose again that $\epsilon_0$, $\epsilon_1$, $\epsilon_2$,... $\epsilon_{n-1}$, $\epsilon_n$ are respectively permittivities at areas 0, 1, 2,...n−1, n, respectively, and that, correspondingly, the sample thicknesses $d_0$, $d_1$, $d_2$...$d_{n-1}$, $d_n$ and distances between sample surface and trace of probe in capacitance mode $z_0$, $z_1$, $z_2$...$z_{n-1}$, $z_n$ are each respectively at the area corresponding to the numerical suffix. Since the capacitance between the probe and the surface of the substrate, the substrate being beneath the sample, is the same in each area, it consists of the followings in area 1.

$$z_0 = z_1 + (\epsilon_0/\epsilon_1)d_1 \quad (15)$$

$$\Delta z_1 = z_1 + d_1 - z_0 = d_1(1 - (\epsilon_0/\epsilon_1)) \quad (16)$$

$$\Delta z_1/d_1 = (1 - (1-(\epsilon_0/\epsilon_1))) \quad (17)$$

Since $\Delta z_1$, $d_1$, $\epsilon_0$ (permittivity in the air) are known, $\epsilon_1$ can be obtained from (17).

Likewise, in the area 2, the followings are executed.

$$z_1 + (\epsilon_0/\epsilon_1)d_1 = z_2 + (\epsilon_0/\epsilon_2) d_2 \quad (18)$$

$$\Delta z_2 = (d_2 + z_2) - (d_1 + z_1) \quad (19)$$

$$\frac{\Delta z_2}{d_2 - d_1} = \quad \text{(Formula 11)}$$

$$\frac{d_2\left(1 - \frac{\epsilon_0}{\epsilon_2}\right) - d_1\left(1 - \frac{\epsilon_0}{\epsilon_1}\right)}{d_2 - d_1} = \frac{d_2\left(1 - \frac{\epsilon_0}{\epsilon_2}\right) - \Delta z_1}{d_2 - d_1}$$

$$\therefore (\Delta z_2 \Delta z_1)/d_2 = (1 - (\epsilon_0/\epsilon_2)) \quad (21)$$

Since $d_2$, $\Delta z_1$, $\Delta z_2$, and $\epsilon_0$ are known, $\epsilon_2$ can be obtained.

Likewise, in the area n, the following is executed:

$$(\Delta z_n \Delta z_{n-1}/d_n) = (1 - (\epsilon_0/\epsilon_n)) \quad d_n = d_{n,n-1} + d_{n-1} \quad (22)$$

Since $\Delta z_n$, $\Delta z_{n-1}$ and $\epsilon_0$ are all known, $\epsilon_n$ can be obtained.

Next, analysis with respect to the stack model is explained hereunder. Suppose that, like in the parallel model above, d is the trace of the probe in the constant mode and z is the trace of probe in the capacitance mode. Suppose again that $\epsilon_0$, $\epsilon_1$, $\epsilon_2$...$\epsilon_{n-1}$, $\epsilon_n$ are, respectively, permittivities at area 0, 1, 2...n−1, n and that, correspondingly, the thicknesses of samples $d_1$, $d_2$...$d_{n-1}$, $d_n$ and distances between sample surface and trace of probe in capacitance mode, $z_0$, $z_1$ $z_2$...$z_{n-1}$, $z_n$ are, respectively, at the area corresponding to the numerical suffix. Since capacitance between sample and substrate is the same in each area, it consists of the followings in area 1.

$$z_0 = z_1 + (\epsilon_0/\epsilon_1)d_1 \quad (15)$$

$$\Delta z_1/d_1 = (1 - \epsilon_0/\epsilon_1) \quad (17)$$

Since $\Delta z_1$, $d_1$, and $\epsilon_0$ (permittivity in the air) are known, $\epsilon_1$ can be obtained from (17).

Likewise, in the area 2, the followings are executed.

$$z_1 = z_2 + (\epsilon_0/\epsilon_2)d_2 \quad (23)$$

$$\Delta z_2 = z_2 d_2 - z_1 = d_2(1 - (\epsilon_0 \epsilon_2)) \quad (24)$$

$$(\Delta z_2/d_2) = (1 - (\epsilon_0 \epsilon_2)) \quad (25)$$

Since $d_2$, $\Delta z_2$ and $\epsilon_0$ are all known, $\epsilon_2$ can be obtained. Likewise, in the area n, the following are executed.

$$(66\ z_n/d_n) = (1 - (\epsilon_0 \epsilon_n)) \tag{26}$$

Since $\Delta Z_n$, $d_n$ and $\epsilon_0$ are all known, $\epsilon_n$ can be obtained.

In case that the material structure is known in advance, whether parallel or stack, the permittivity in each area can be obtained, applying the above model. The displacement method has been explained above, based on a system that uses an optical lever. But other method such as one using optical interferometer, etc., can also be applied for displacement detection of a probe.

The detection time constant can be reduced to about 1/10, by replacing voltage amplitude detection by way of a discrete Fourier transformation circuit instead of using two sets of lock-in amplifiers. Accordingly, measuring time necessary for obtaining data for an image can be reduced to several minutes from about several tens of minutes in the prior art.

And since output of a discrete Fourier transformation circuit can, as it is, be applied to both alternating current and direct current power sources, not only can the circuit system and connections be simplified, but also comparative calibration of meters and equipment becomes unnecessary. Although only macroscopic information of sample permittivity distribution have been obtained before, information at a resolution under submicron order level can now be obtained.

This application relates to subject matter disclosed in Japanese Application number 4-348584, filed on Dec. 28, 1992, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A scanning probe microscope comprising:
   a sample stage defining a sample holding position for holding a sample;
   electronic lever means having a conductive probe with a sharply pointed tip, said tip facing said sample holding position;
   oscillator means connected for applying a sine wave voltage to said lever means for causing said probe to undergo a sine wave oscillation in a direction between said probe and the sample position;
   displacement detecting means connected for detecting a quantity which is one of displacement and amplitude of oscillatory movement of said probe;
   servo means and piezoelectronic actuator means connected to said detecting means for controlling the quantity which is detected by said displacement means to cause the quantity to have a selected value;
   means connected for applying a direct current voltage between said probe and a sample in the sample holding position; and
   processing means connected for calculating distribution of surface potential and surface permittivity of a sample at said sample holding position after detection is performed by said displacement detecting means, said processing means comprising an analog processor using a discrete Fourier transformation.

2. A scanning probe microscope as claimed in claim 1, wherein said analogue processor is coupled with both said oscillator means and said displacement detecting means, and said analog processor comprises:
   first multiplier means connected for multiplying a signal representative of the sine wave voltage produced by said oscillator means and a signal representative of the quantity detected by said displacement detecting means for producing a first multiplication result signal;
   first low pass filter means connected to said first multiplier means for smoothing the first multiplication result signal;
   first amplifier means connected to said first low pass filter means for amplifying the smoothed first multiplication result signal;
   second multiplier means connected to receive the sine wave voltage from said oscillator means for producing an output signal representative of the square of the sine wave voltage produced by said oscillator means;
   second low pass filter means connected to said first multiplier means for smoothing the output signal from said second multiplier means;
   subtractor means having inputs connected to receive the output signal from said second multiplier means and the smoothed output signal from said second low pass filter means and for outputting a difference signal representing the difference between the signals at said inputs of said subtractor means;
   third multiplier means connected to said displacement detecting means to receive a signal representing the quantity detected by said displacement detecting means and connected to said subtractor means to receive the difference signal outputted by said subtractor means, for producing a second multiplication result signal;
   third low pass filter means connected to said third multiplier means for smoothing the second multiplication result signal;
   second amplifier means connected to said third low pass filter means for amplifying the smoothed second multiplication result signal;
   divider means connected for dividing the output of said first amplifier means by the output of said second amplifier means; and
   feedback circuit means connected to said first amplifier means for effecting adjustment of the potential of a sample in the sample holding position, and further wherein the output of said second amplifier means is connected to said servo system and is used by said servo system to controls said piezoelectronic actuator means.

3. A scanning probe microscope as claimed in claim 2, wherein distribution of surface potential of a sample in the sample holding position is obtained through a processing operation using a value obtained when the output signal of said first amplifier means of said analog processor using discrete Fourier transformation is divided by the output signal of said second amplifier means.

4. A scanning probe microscope as claimed in claim 2, wherein distribution of permittivity of a sample is obtained through a processing operation using irregularity information of each picture element of a sample surface and the output of said second amplifier means of said analog processor using discrete Fourier transformation.

* * * * *